(12) United States Patent
Choi

(10) Patent No.: US 11,809,048 B2
(45) Date of Patent: Nov. 7, 2023

(54) ARRAY SUBSTRATE, LIQUID CRYSTAL DISPLAY PANEL AND DISPLAY DEVICE

(71) Applicant: BOE Technology Group Co., Ltd., Beijing (CN)

(72) Inventor: Hyunsic Choi, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/475,045

(22) Filed: Sep. 14, 2021

(65) Prior Publication Data
US 2022/0236613 A1 Jul. 28, 2022

(30) Foreign Application Priority Data
Jan. 27, 2021 (CN) .......................... 202110113710.5

(51) Int. Cl.
*G02F 1/1343* (2006.01)
*G02F 1/1362* (2006.01)

(52) U.S. Cl.
CPC .... *G02F 1/134309* (2013.01); *G02F 1/13439* (2013.01); *G02F 1/136286* (2013.01)

(58) Field of Classification Search
CPC ........... G02F 1/13439; G02F 1/134309; G02F 1/134372; G02F 1/134363; G02F 1/136286
See application file for complete search history.

(56) References Cited

U.S. PATENT DOCUMENTS

| | | | |
|---|---|---|---|
| 2015/0205171 A1* | 7/2015 | Tsuruma | G02F 1/134309 349/46 |
| 2016/0171946 A1* | 6/2016 | Chen | G02F 1/136286 257/72 |
| 2016/0299394 A1* | 10/2016 | Yoshida | G02F 1/13306 |
| 2017/0115542 A1* | 4/2017 | Oh | G02F 1/136286 |
| 2021/0382359 A1* | 12/2021 | Lu | G02F 1/13439 |

* cited by examiner

*Primary Examiner* — Mariam Qureshi
(74) *Attorney, Agent, or Firm* — IPRO, PLLC

(57) ABSTRACT

The present disclosure discloses an array substrate, a liquid crystal display panel and a display device. The array substrate includes: a base substrate, and a first electrode and a second electrode located in a region defined by intersection of two adjacent data lines, a gate line and a common electrode signal line, where the second electrode is located on a side of the first electrode facing away from the base substrate; the first electrode is in a block shape; the second electrode has a symmetry axis perpendicular to the gate line and passing through the center of the second electrode; the second electrode includes: a frame with an opening in a side; an opening side of the frame faces a first type of signal lines; the first type of signal lines are other signal lines than the data lines and signal lines parallel to the data lines.

18 Claims, 3 Drawing Sheets

ARRAY SUBSTRATE, LIQUID CRYSTAL DISPLAY PANEL AND DISPLAY DEVICE

CROSS-REFERENCES TO RELATED APPLICATIONS

The present disclosure claims priority to Chinese Patent Application No. 202110113710.5, filed with the China National Intellectual Property Administration on Jan. 27, 2021, the content of which is hereby incorporated by reference in its entirety.

FIELD

The present disclosure relates to the technical field of display, and particularly to an array substrate, a liquid crystal display panel and a display device.

BACKGROUND

A liquid crystal display (LCD) is widely used in modern information equipment, such as displays, TVs, mobile phones, and digital products, due to its advantages of light weight, low power consumption, low radiation, convenient portability and the like. The main structure of the liquid crystal display is composed of an array substrate, a color film substrate and a liquid crystal layer filled between the array substrate and the color film substrate.

However, the liquid crystal display in the related art has the problem that liquid crystals are not driven in a specified direction, which causes liquid crystal (LC) disclination in pixels, and thus black lines exist in the pixels.

SUMMARY

The present disclosure provides an array substrate, a liquid crystal display panel and a display device.

An embodiment of the present disclosure provides an array substrate. The array substrate includes: a base substrate, data lines located on a side of the base substrate and extending in a first direction, a gate line and a common electrode signal line extending in a second direction, and a first electrode and a second electrode located in a region defined by intersection of two adjacent data lines, the gate line and the common electrode signal line, wherein the second electrode is located on a side of the first electrode facing away from the base substrate; the first electrode is in a block shape; the second electrode has a symmetry axis perpendicular to the gate line and passing through a center of the second electrode; the second electrode includes: a frame with an opening in a side, and a first group of electrode strips and a second group of electrode strips located in the frame and disposed on two sides of the symmetry axis respectively, the first group of electrode strips includes a plurality of first sub-electrode strips connected with the frame and extending in a third direction, and the second group of electrode strips includes a plurality of second sub-electrode strips connected with the frame and extending in a fourth direction; and an opening side of the frame faces a first type of signal lines, the first type of signal lines are other signal lines than the data lines and signal lines parallel to the data lines, and the fourth direction and the third direction are different extending directions.

An embodiment of the present disclosure further provides a liquid crystal display panel, including the array substrate provided by embodiments of the present disclosure.

An embodiment of the present disclosure further provides a display device, including the liquid crystal display panel provided by embodiments of the present disclosure.

DETAILED DESCRIPTION

In order to make the objectives, technical solutions, and advantages of embodiments of the present disclosure clearer, the technical solutions of embodiments of the present disclosure will be described clearly and completely in combination with the accompanying drawings of embodiments of the present disclosure. It is to be understood that the described embodiments are some, but not all, embodiments of the present disclosure. Based on the described embodiments of the present disclosure, all other embodiments attainable by those ordinary skilled in the art without involving any inventive effort are within the scope of the present disclosure.

Unless otherwise defined, the technical terms or scientific terms used herein shall have the general meanings understood by those with ordinary skills in the field to which this disclosure belongs. The "first", "second" and similar words used in the present disclosure do not denote any order, quantity or importance, but are only used to distinguish different components. "Including" or "containing" and other similar words mean that an element or article that precedes the word is inclusive of the element or article listed after the word and equivalents thereof, but does not exclude other elements or articles. The terms "connecting" or "connected", and the like, are not limited to physical or mechanical connections, but may include electric connections, whether direct or indirect. The terms "upper", "lower", "left", "right", and the like are used merely to denote a relative positional relationship that may change accordingly when the absolute position of an object being described changes.

In order to keep the following descriptions of embodiments of the present disclosure clear and concise, detailed descriptions of known functions and known components are omitted from the present disclosure.

Figure 1:
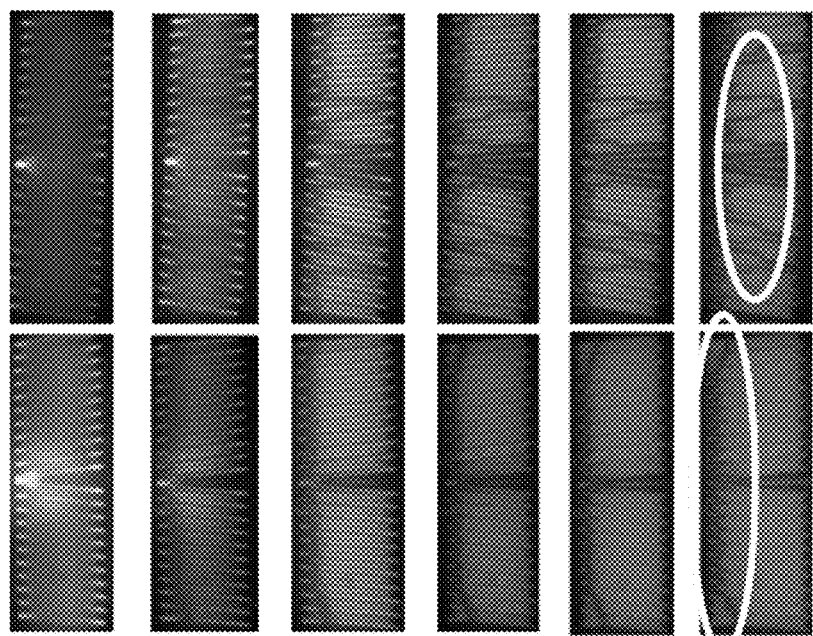
FIG. 1 is a schematic diagram of black lines occurring in pixels of a unit cell.

An ADS pro mode is a traditional structure in which each pixel of RGB is in a vertical direction. In an initial stage, LC disclination occurs when a non-thin-film transistor (Unit Cell) sample simply composed of a second electrode layer (1ITO)-an insulating layer-a first electrode layer (2ITO, an electrode pattern with slits) is used for evaluation, as shown in FIG. 1. The left and right sides of an ITO slit formed by 2nd ITO are closed structures. Since initial shapes of the left and right sides are identical, liquid crystals may move towards opposite directions and conflict along with voltages on the left and right sides, the liquid crystal in the middle region (the white circle in FIG. 1) cannot fall towards the horizontal direction and continue to maintain a vertical state, thus light cannot pass through, and black line-like LC disclination appears. The upper part in FIG. 1 shows the situation where LC disclination occurs when a Rubbing process is not performed, and the lower part in FIG. 1 shows the situation where LC disclination occurs when the Rubbing process is performed. It may be seen from FIG. 1 that when the Rubbing is not done, the left and right sides have the same shape, so the two sides are driven at the same time, and LC disclination occurs at a plurality of locations. After Rubbing is done, the driving speed of a Rubbing start end is relatively fast, so LC disclination occurs concentratedly at a Rubbing end part.

Figure 2:
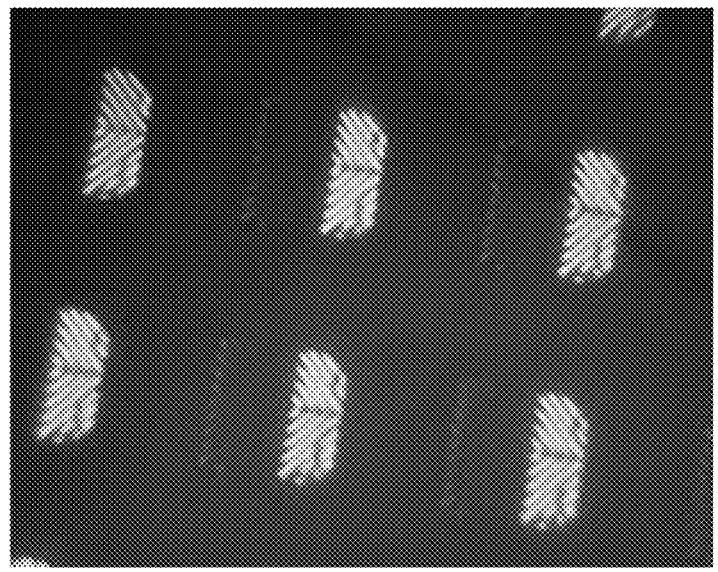
FIG. 2 is a schematic diagram of black lines occurring in pixels of 55" panel.

An improvement solution proposed to solve this problem is to open one of the left or right sides (ITO open), which also has an improvement effect in actual evaluation. However, when the design concept is applied on a thin film transistor sample actually composed of a second electrode layer (1ITO)-a gate layer (Gate)-an insulating layer-a source and drain layer (S/D)-an insulating layer-a first electrode layer (2ITO, an electrode pattern with slits), as shown in FIG. 2, LC disclination occurs. A core difference between the improvement solution for the non-thin-film transistor sample and the thin film transistor sample is whether there are data lines (S/D lines) on the left and right sides of the ITO slit formed by 2nd ITO. A main reason for LC disclination occurring on the thin film transistor sample is that a voltage of the S/D line may change continuously over time during driving, therefore, although the ITO on a side is open, a pixel is designed to be in a form of ITO open, the liquid crystals on both sides may still be driven at the same time, and conflict in the middle region, resulting in black lines. It is determined that the reason for the core difference is that the voltage loaded on the S/D line changes continuously over time.

Figure 3:
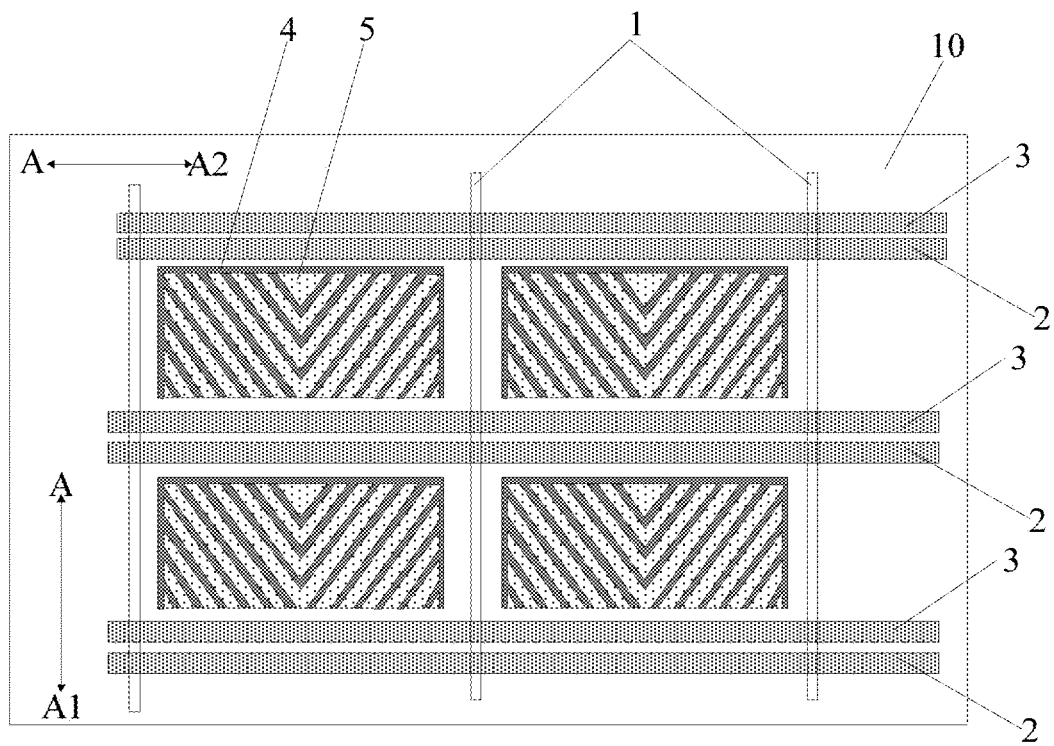
FIG. 3 is a schematic structural diagram of an array substrate provided by an embodiment of the present disclosure.
Figure 4:
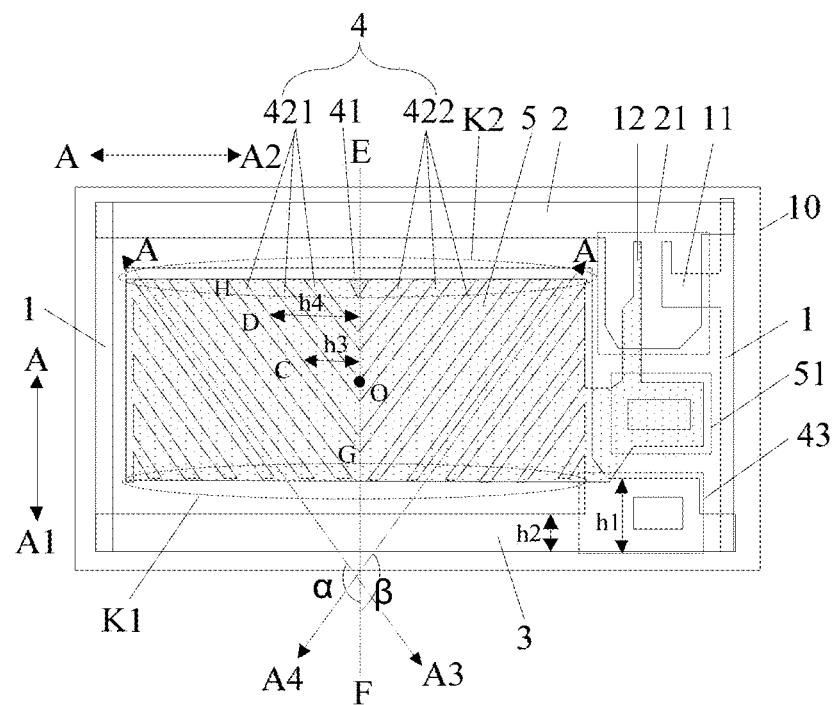
FIG. 4 is a schematic diagram of an enlarged structure of a pixel provided by an embodiment of the present disclosure.

In view of this, referring to FIG. 3 and FIG. 4, an embodiment of the present disclosure provides an array substrate, including: a base substrate 10, data lines 1 located on a side of the base substrate 10 and extending in a first direction AA1, gate lines 2 and common electrode signal lines 3 extending in a second direction AA2, and first electrodes 5 and second electrodes 4, each pair of a first electrode 5 and a second electrode 4 are located in a region defined by intersection of two adjacent data lines 1, the corresponding gate line 2 and the corresponding common electrode signal line 3, where the second electrode 4 is located on a side of the first electrode 5 facing away from the base substrate 10.

The first electrode 5 is in a block shape.

The second electrode 4 has a symmetry axis EF perpendicular to the corresponding gate line 2 and passing through the center O of the second electrode 4 (for example, if the outer contour of the second electrode 4 is a rectangle, then the center of the second electrode 4 is the center of the rectangle). The second electrode 4 includes a frame 41 with an opening in a side (for example, in FIG. 3, the lower side of the frame 41 is opened), and a first group of electrode strips and a second group of electrode strips located in the frame 41 and disposed on two sides of the symmetry axis EF, the first group of electrode strips includes a plurality of first sub-electrode strips 421 connected with the frame 41 and extending in a third direction AA3 (an included angle α formed by intersecting the third direction AA3 with the symmetry axis EF and facing the opening side of the frame 41 is an obtuse angle, in some embodiments, the obtuse angle may be 120°-150°, for example, may be 135°, and the second group of electrode strips includes a plurality of second sub-electrode strips 422 connected with the frame 41 and extending in a fourth direction AA4 (an included angle β formed by intersecting the fourth direction AA4 with the symmetry axis EF and facing the opening side of the frame 41 is an obtuse angle, in some embodiments, the obtuse angle may be 120°-150°, for example, may be 135°); and the opening side of each frame 41 faces a first type of signal lines, the first type of signal lines are other signal lines than the data lines 1 and signal lines parallel to the data lines 1, for example, the first type of signal lines may be the gate lines 2 or the common electrode signal lines 3, and the fourth direction AA4 and the third direction AA3 are different extending directions.

In an embodiment of the present disclosure, the second electrode 4 has slits and an opening in a side, the opening side of the frame 41 faces the first type of signal lines, the first type of signal lines are other signal lines than the data lines 1 and the signal lines parallel to the data lines 1. For example, the first type of signal lines may be the gate lines 2 or the common electrode signal lines 3. Electrical signals loaded by the gate lines 2 and the common electrode signal lines 3 remain unchanged in most of the time. For example, the electrical signals of the gate lines 2 are Vgh (for example, 32-35V) in a very short time, and are Vgl (for example, −8~−10V) in all other time. When the refresh frequency is 60 Hz and the resolution is 4K, the gate lines 2 only have the Vgh voltage for 1/2160/60 seconds, and maintain the Vgl voltage for the remaining 2159/2160/60 seconds. Compared with the data lines 1, the Vgl voltage may be maintained all the time in a relative long time, that is, by making the signal line facing the opening side K1 of the second electrode 4 as a signal line with electrical signals substantially unchanged, and making the signal line facing an opposite side K2 of the second electrode 4 as a signal line with electrical signals substantially unchanged, the problem of black lines in pixels is avoided, where the opposite side K2 is the side of the frame 41 opposite to the opening side K1. Moreover, the block-shaped first electrode 5 is located on the side of the second electrode 4 with the slits facing the base substrate 10, to prevent the block-shaped first electrode 5 from covering an electric field formed by the second electrode 4 and the first electrode 5.

In some embodiments, referring to FIG. 4, the opening side K1 of the frame 41 faces the corresponding common electrode signal line 3. Compared with the opening side K1 facing the corresponding gate line 2, in an embodiment of the present disclosure, the opening side faces the common electrode signal line 3, and thus interference with special electric fields is avoided. When the opening side faces the gate line 2, an electric field may be formed between the second electrode 4 and the first electrode 5, the extending direction of the electrode strips at the opening position of the second electrode 4 is not perpendicular to the gate line 2, but crossed in an oblique direction (for example, extending at 45 degrees with the gate line 2), so the electric field may also compound in a plurality of directions such as vertical and 45 degrees, and the liquid crystals at the opening position may also be driven under a low voltage (the liquid crystals may fall down due to the voltage). Under a low voltage, the liquid crystals in two regions at the opening side and the side opposite to the opening may be driven by the voltage, so when falling down, the liquid crystals partially conflict and some black lines are also generated.

Figure 5:
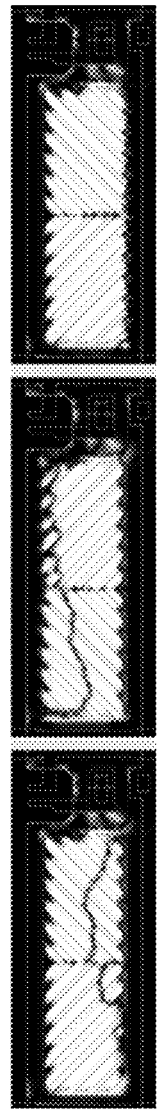
FIG. 5 is a schematic diagram of black lines occurring in pixels when an electrode with slits is of a closed structure and an opening side of the electrode faces different directions.

The third figure from the left in FIG. 5 is an LC disclination simulation result of a structure provided by an embodiment of the present disclosure (that is, the opening side of the second electrode 4 faces the corresponding common electrode signal line 3, the data lines 1 are on the left and right sides of the second electrode 4, the corresponding gate line 2 is on the upper side, and the corresponding common electrode signal line 3 is on the lower side). The second figure from the left is an LC disclination simulation result when the opening side of the second electrode with the slits faces the corresponding gate line (that is, the corresponding data lines are on the left and right sides of the second electrode, the corresponding gate line is on the upper side, and the corresponding common electrode signal line is on the lower side). The first figure from the left is an LC disclination simulation result when the upper and lower sides of the second electrode with the slits are closed (that is, the corresponding data lines are on the left and right sides of the second electrode, the corresponding gate line is on the upper side, and the corresponding common electrode signal line is on the lower side). It may be seen that when the opening side is designed to face the corresponding common electrode signal line 3, the effect of improving the black lines in the pixels is the best.

Figure 6:
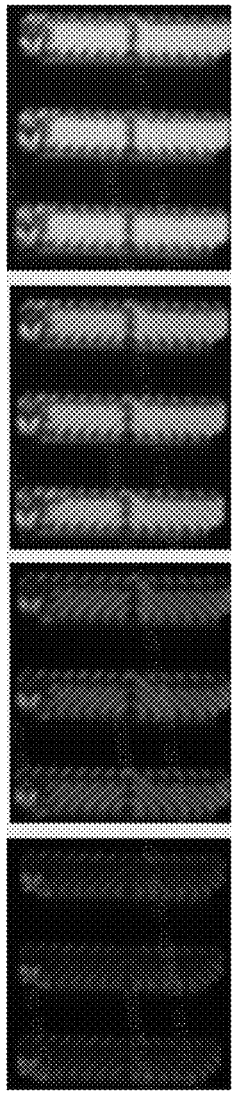
FIG. 6 is a schematic diagram of black lines occurring in pixels of an array substrate provided by an embodiment of the present disclosure under different voltages.

FIG. 6 is a result schematic diagram when voltages applied to the second electrode 4 are 5V, 6V, 8V, and 10V from left to right, and the voltage applied to the first electrode 5 is 0V through an actual evaluation result of LC disclination of the array substrate shown in FIG. 4 provided by an embodiment of the present disclosure. The liquid crystals act with a voltage difference between the second electrode 4 and the second electrode 5, and the greater the voltage difference is, the more the liquid crystals rotate. Initially, the liquid crystals close to the opening side of the second electrode 4 conflict, but it may be seen that as the driving voltage increases, LC disclination is squeezed to a side and remains still. It should be noted that FIG. 6 is taken in a vertical direction when being taken in order to see the effect of horizontal pixels. An embodiment of the present disclosure proposes a solution combining an Advanced Super Dimension Switch (ADS) pro structure with a triple gate structure, a basic condition for improving LC disclination is Rubbing and the structure that the electrodes with the slits are provided with openings, in addition, when a horizontal pixel shape similar to Triple Gate is designed and the common electrode signal lines are formed on the opening sides of the electrodes with the slits, a better effect of improving the black lines in the pixels is achieved, and the same improvement effect in the simulation structure and actual evaluation may be seen.

In some embodiments, referring to FIG. 4, a distance between each first sub-electrode strip 421 and the symmetry axis EF gradually increases from an end close to the opening side K1 of the frame 41 to an end close to an opposite side K2 of the frame 41. For example, taking the fourth first sub-electrode strip 421 from top to bottom on the left side of the symmetry axis EF in FIG. 3 as an example, the distance between the first sub-electrode strip 421 and the symmetry axis EF gradually increases from one end G close to the opening side of the frame 41 to one end H close to the opposite side of the opening of the frame 41. For example, compared to a second position point D of the first sub-electrode strip 421, a first position point C on the first sub-electrode strip 421 is closer to the opening side, and a distance h3 between the first position point C and the symmetry axis EF is smaller than a distance h4 between the second position point D and the symmetry axis EF.

In some embodiments, each first sub-electrode strip 421 and one second sub-electrode strip 422 may be symmetric with respect to the symmetry axis EF. At least part of the first sub-electrode strips 421 and the second sub-electrode strips 422 intersect at the symmetry axis EF to form a V-shaped structure facing away from the opening side of the frame 41.

In some embodiments, referring to FIG. 4, the shape of the frame 41 is a rectangle, and long edges of the rectangle are parallel to the corresponding gate line 2.

In some embodiments, the second electrode 4 is a common electrode, and the first electrode 5 is a pixel electrode; or, the second electrode 4 is a pixel electrode, and the first electrode 5 is a common electrode.

In some embodiments, referring to FIG. 4, the array substrate further includes: a connecting part 43 integrally connected with the second electrode 4, an orthographic projection of the connecting part 43 on the base substrate 10 and an orthographic projection of the corresponding common electrode signal line 3 on the base substrate 10 have an overlapping region, and the connecting part 43 is connected with the corresponding common electrode signal line 3 through perforation in the overlapping region. In some embodiments, the array substrate further includes: a source electrode 11 connected with the data line 1, a drain electrode 12, and an extension part 51 integrally connected with the first electrode 5, the extension part 51 may be connected with the corresponding drain electrode 12 through a via hole.

In some embodiments, a first electrode layer, a gate insulating layer, an active layer, a source and drain layer, a passivation layer, and a second electrode layer may be sequentially disposed on a side of the base substrate 10. The first electrode layer may include the first electrode 5, the extension part 51 connected with the first electrode 5, the gate line 2, the gate 21 connected with the gate line 2, and the common electrode signal line 3. Material of the second electrode 4 and the extension part 51 may be indium tin oxide (ITO), and material of the gate line 2, the gate 21 connected with the gate line 2, and the common electrode signal line 3 may be metal. The second electrode layer may include the second electrode 4, and the connecting part 43 connected with the second electrode 4, and material of the second electrode 4 and the connecting part 43 may be indium tin oxide (ITO). Re-explanation is made based on film layer positions, the second electrode 4, the gate line 2, the common electrode signal line 3 are all on the same layer, but not connected to each other; the gate line 2 and the common electrode signal line 3 are made of the same metal, and the second electrode 4 is made of ITO; and the first electrode 5 is on the lowermost layer, and connected with the common electrode signal line 3 on the lower layer through a via hole, so electrical signals are also given Vcom signals.

In some embodiments, referring to FIG. 4, the array substrate includes the gate 21 connected with the gate line 2, and the connecting part 43 and the gate 21 are located on the same side of the second electrode 4.

In some embodiments, referring to FIG. 4, in a direction parallel to the base substrate 10 and perpendicular to the gate line 2, a width h1 of the connecting part 43 is greater than a width h2 of the corresponding common electrode signal line 3. In an embodiment of the present disclosure, the width h1 of the connecting part 43 is greater than the width h2 of the corresponding common electrode signal line 3, so that the orthographic projection of the connecting part 43 on the base substrate 10 and the orthographic projection of the corresponding common electrode signal line 3 on the base substrate 10 have a sufficient overlapping region so as to facilitate subsequent connection of the connecting part 43 with the common electrode signal line 3 through perforation.

An embodiment of the present disclosure also provides a liquid crystal display panel, including the array substrate provided by embodiments of the present disclosure.

An embodiment of the present disclosure also provides a display device, including the liquid crystal display panel provided by embodiments of the present disclosure.

Embodiments of the present disclosure have the following beneficial effects: in embodiments of the present disclosure, the second electrode has slits and is open in a side, the opening side of the frame faces a first type of signal lines, the first type of signal lines are other signal lines than the data lines and the signal lines parallel to the data lines, for example, the first type of signal lines may be the gate lines or the common electrode signal lines, where the electrical signals loaded by the gate lines and the common electrode signal lines remain unchanged in most of the time, for example, the electrical signals of the gate lines are Vgh (for example, 32-35V) in a very short time, and are Vgl (for example, −8~−10V) in all other time, when the refresh frequency is 60 Hz and the resolution is 4K, the gate lines only have the Vgh voltage for 1/2160/60 seconds, and maintain the Vgl voltage for the remaining 2159/2160/60 seconds, compared with the data lines, the Vgl voltage may be maintained all the time in a relative long time, that is, by making the signal line facing the opening side of the second electrode as a signal line with electrical signals substantially unchanged, and making the signal line facing the opposite side of the second electrode as a signal line with electrical signals substantially unchanged, the problem of the black lines in the pixels is avoided, where the opposite side is the side of the frame opposite to the opening side.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. An array substrate, comprising: a base substrate, data lines located on a side of the base substrate and extending in a first direction, a gate line and a common electrode signal line extending in a second direction, and a first electrode and a second electrode located in a region defined by intersection of two adjacent data lines, the gate line and the common electrode signal line, wherein the second electrode is located on a side of the first electrode facing away from the base substrate;

the first electrode is in a block shape;

the second electrode has a symmetry axis perpendicular to the gate line and passing through a center of the second electrode; the second electrode comprises: a frame with an opening in a side, and a first group of electrode strips and a second group of electrode strips located in the frame and disposed on two sides of the symmetry axis respectively, the first group of electrode strips comprises a plurality of first sub-electrode strips connected with the frame and extending in a third direction, and the second group of electrode strips comprises a plurality of second sub-electrode strips connected with the frame and extending in a fourth direction; and an opening side of the frame faces the common electrode signal line, and the fourth direction and the third direction are different extending directions;

wherein the opening is not surrounded by the second electrode.

2. The array substrate according to claim 1, wherein the second electrode is a common electrode, and the first electrode is a pixel electrode; or, the second electrode is a pixel electrode, and the first electrode is a common electrode.

3. The array substrate according to claim 1, wherein the array substrate further comprises: a connecting part integrally connected with the second electrode, an orthographic projection of the connecting part on the base substrate and an orthographic projection of the common electrode signal line on the base substrate have an overlapping region, and the connecting part is connected with the common electrode signal line through perforation in the overlapping region.

4. The array substrate according to claim 3, wherein the array substrate comprises a gate connected with the gate line, and the connecting part and the gate are located on a same side of the second electrode.

5. The array substrate according to claim 4, wherein in a direction parallel to the base substrate and perpendicular to the gate line, a width of the connecting part is greater than a width of the common electrode signal line.

6. The array substrate according to claim 1, wherein a distance between each first sub-electrode strip and the symmetry axis gradually increases from an end close to the opening side of the frame to an end close to an opposite side of the opening of the frame.

7. The array substrate according to claim 6, wherein at least a part of the first group of electrode strips and/or at least a part of the second group of electrode strips extends to the opening side of the frame.

8. The array substrate according to claim 7, wherein an edge of the electrode strip extending to the opening side is substantially flush with an edge of the frame at the opening side.

9. The array substrate according to claim 7, wherein the first group of electrode strips and the second group of electrode strips all extend to the opening side of the frame.

10. The array substrate according to claim 1, wherein a shape of the frame is a rectangle, and long edges of the rectangle are parallel to the gate line.

11. A liquid crystal display panel, comprising an array substrate, wherein the array substrate comprises: a base substrate, data lines located on a side of the base substrate and extending in a first direction, a gate line and a common electrode signal line extending in a second direction, and a first electrode and a second electrode located in a region defined by intersection of two adjacent data lines, the gate line and the common electrode signal line, wherein the second electrode is located on a side of the first electrode facing away from the base substrate;

the first electrode is in a block shape;

the second electrode has a symmetry axis perpendicular to the gate line and passing through a center of the second electrode; the second electrode comprises: a frame with an opening in a side, and a first group of electrode strips and a second group of electrode strips located in the frame and disposed on two sides of the symmetry axis respectively, the first group of electrode strips comprises a plurality of first sub-electrode strips connected with the frame and extending in a third direction, and the second group of electrode strips comprises a plurality of second sub-electrode strips connected with the frame and extending in a fourth direction; and an opening side of the frame faces the common electrode signal line, and the fourth direction and the third direction are different extending directions;

wherein the opening is not surrounded by the second electrode.

12. The liquid crystal display panel according to claim 11, wherein the second electrode is a common electrode, and the first electrode is a pixel electrode; or, the second electrode is a pixel electrode, and the first electrode is a common electrode.

13. The liquid crystal display panel according to claim 11, wherein the array substrate further comprises: a connecting part integrally connected with the second electrode, an orthographic projection of the connecting part on the base substrate and an orthographic projection of the common electrode signal line on the base substrate have an overlapping region, and the connecting part is connected with the common electrode signal line through perforation in the overlapping region.

14. The liquid crystal display panel according to claim 13, wherein the array substrate comprises a gate connected with the gate line, and the connecting part and the gate are located on a same side of the second electrode.

15. The liquid crystal display panel according to claim 14, wherein in a direction parallel to the base substrate and perpendicular to the gate line, a width of the connecting part is greater than a width of the common electrode signal line.

16. The liquid crystal display panel according to claim 11, wherein a distance between each first sub-electrode strip and the symmetry axis gradually increases from an end close to the opening side of the frame to an end close to an opposite side of the opening of the frame.

17. The liquid crystal display panel according to claim 11, wherein a shape of the frame is a rectangle, and long edges of the rectangle are parallel to the gate line.

18. A display device, comprising a liquid crystal display panel, wherein the liquid crystal display panel comprises an array substrate, and the array substrate comprises: a base substrate, data lines located on a side of the base substrate and extending in a first direction, a gate line and a common electrode signal line extending in a second direction, and a first electrode and a second electrode located in a region defined by intersection of two adjacent data lines, the gate line and the common electrode signal line, wherein the second electrode is located on a side of the first electrode facing away from the base substrate;

the first electrode is in a block shape;

the second electrode has a symmetry axis perpendicular to the gate line and passing through a center of the second electrode; the second electrode comprises: a frame with an opening in a side, and a first group of electrode strips and a second group of electrode strips located in the frame and disposed on two sides of the symmetry axis respectively, the first group of electrode strips comprise a plurality of first sub-electrode strips connected to the frame and extending in a third direction, and the second group of electrode strips comprise a plurality of second sub-electrode strips connected to the frame and extending in a fourth direction; and an opening side of the frame faces the common electrode signal line, and the fourth direction and the third direction are different extending directions;

wherein the opening is not surrounded by the second electrode.

* * * * *